United States Patent
Merrill

(10) Patent No.: US 12,268,220 B2
(45) Date of Patent: *Apr. 8, 2025

(54) PROTEIN FORTIFIED YOGURTS AND METHODS OF MAKING

(71) Applicant: Leprino Foods Company, Denver, CO (US)

(72) Inventor: Richard K. Merrill, Highlands Ranch, CO (US)

(73) Assignee: Leprino Foods Company, Denver, CO (US)

(*) Notice: Subject to any disclaimer, the term of this patent is extended or adjusted under 35 U.S.C. 154(b) by 94 days.

This patent is subject to a terminal disclaimer.

(21) Appl. No.: 18/305,984

(22) Filed: Apr. 24, 2023

(65) Prior Publication Data

US 2023/0255223 A1    Aug. 17, 2023

Related U.S. Application Data

(63) Continuation of application No. 14/250,518, filed on Apr. 11, 2014, now Pat. No. 11,653,660.

(60) Provisional application No. 61/810,996, filed on Apr. 11, 2013.

(51) Int. Cl.
A23C 9/13    (2006.01)

(52) U.S. Cl.
CPC ...... *A23C 9/1307* (2013.01); *A23C 2260/102* (2013.01)

(58) Field of Classification Search
CPC .............................. A23C 9/1307; A23C 9/13
See application file for complete search history.

(56) References Cited

U.S. PATENT DOCUMENTS

| | | | |
|---|---|---|---|
| 3,896,241 A | 7/1975 | Malaspina et al. |
| 3,963,836 A | 6/1976 | Henson et al. |
| 4,434,184 A | 2/1984 | Kharrazi |
| 4,968,512 A | 11/1990 | Kharrazi |
| 5,143,742 A | 9/1992 | Maroudas |
| 5,714,182 A | 2/1998 | Bisson et al. |
| 6,558,716 B1 | 5/2003 | Kent et al. |
| 7,083,815 B2 | 8/2006 | Gutknecht et al. |
| 7,258,886 B2 | 8/2007 | Brue et al. |
| 7,763,294 B2 | 7/2010 | Gutknecht et al. |
| 8,043,639 B2 | 10/2011 | Sasaki et al. |
| 8,298,604 B2 | 10/2012 | Gutknecht et al. |
| 2005/0181095 A1 | 8/2005 | Achs |
| 2007/0065560 A1 | 3/2007 | Lee et al. |
| 2007/0128324 A1 | 6/2007 | Lowe |
| 2007/0134374 A1 | 6/2007 | Boenisch et al. |
| 2009/0074932 A1 | 3/2009 | Swan et al. |
| 2010/0021595 A1 | 1/2010 | Bhaskar |
| 2010/0092608 A1 | 4/2010 | Gutknecht et al. |
| 2010/0129493 A1 | 5/2010 | Monster et al. |
| 2011/0287147 A1 | 11/2011 | Pannell et al. |
| 2013/0156889 A1 | 6/2013 | Schroeder |

FOREIGN PATENT DOCUMENTS

| | | |
|---|---|---|
| EP | 0184267 A1 | 6/1986 |
| EP | 0741975 A1 | 11/1996 |
| EP | 0841856 A1 | 1/2000 |
| EP | 1350433 A1 | 10/2003 |
| WO | 1992/003058 | 3/1992 |
| WO | 2013/090328 A1 | 6/2013 |

OTHER PUBLICATIONS

Gea Filtration, Ultrafiltration of Whey. 2012 . . . [Accessed on Dec. 8, 2015] Retrieved from the internet, <URL: https :web. archive. org/web/20120712164248/http:l/www .g eafiltration.com/applications/u ltrafiltration_ whey. asp>.

Isleten, et al., "Effects of Functional Dairy Based Proteins on Nonfat Yogurt Quality," Faculty of Engineering-Architecture Department of Food Engineering Terzioglu Campus, Dec. 31, 2008, 16 pages.

Milk Facts, Milk Protein. 2012. [Accessed on Dec. 8, 2015] Retrieved from the internet, <URL: https://web. archive.org/web/20121 028064230/http://milkfacts.info/milk%20composition/protein. htm>.

Mistry, et al. "Manufacture of Nofat Yogurt form a High Milk Protein Powder," Journal of Dairy Science, Dec. 31, 1992, 11 pages.

Oxford English Dictionary, https://www.oed.com/view/Entry/232044?redirectedFrom=yogurt#eid 3 pages.

(Continued)

*Primary Examiner* — Jeffrey P Mornhinweg
(74) *Attorney, Agent, or Firm* — Kilpatrick Townsend & Stockton LLP

(57) ABSTRACT

Methods of making protein-fortified yogurt products are described. The methods may include mixing a casein-containing ingredient with starting milk to make a yogurt milk, where the casein-containing ingredient has a casein-to-whey protein ratio of 82:18 or greater. The yogurt milk may be fermented after adding yogurt culture to make a yogurt mixture. The yogurt mixture may then be formed into the protein-fortified yogurt product. The total protein concentration in the protein-fortified yogurt product may be 10 wt. % or more. One variety of the protein-fortified yogurt product is a spreadable yogurt product having the total protein concentration of 11 wt. % or more.

35 Claims, 4 Drawing Sheets

(56) References Cited

OTHER PUBLICATIONS

Peng, Y., Serra, M., Horne, D. S., and Lucey, J. A., "Effect of Fortification with Various Types of Milk Proteins on the Rheological Properties and Permeability of Nonfat Set Yogurt", Journal of Food Science, vol. 74, No. 9, C666-C673 (2009).

International Search Report and Written Opinion of international patent application No. PCT/US2014/033734, mailed on Dec. 2, 2014, 18 pages.

International Preliminary Report on Patentability of international patent application No. PCT/US2014/033734, issued Oct. 13, 2015, 12 pages.

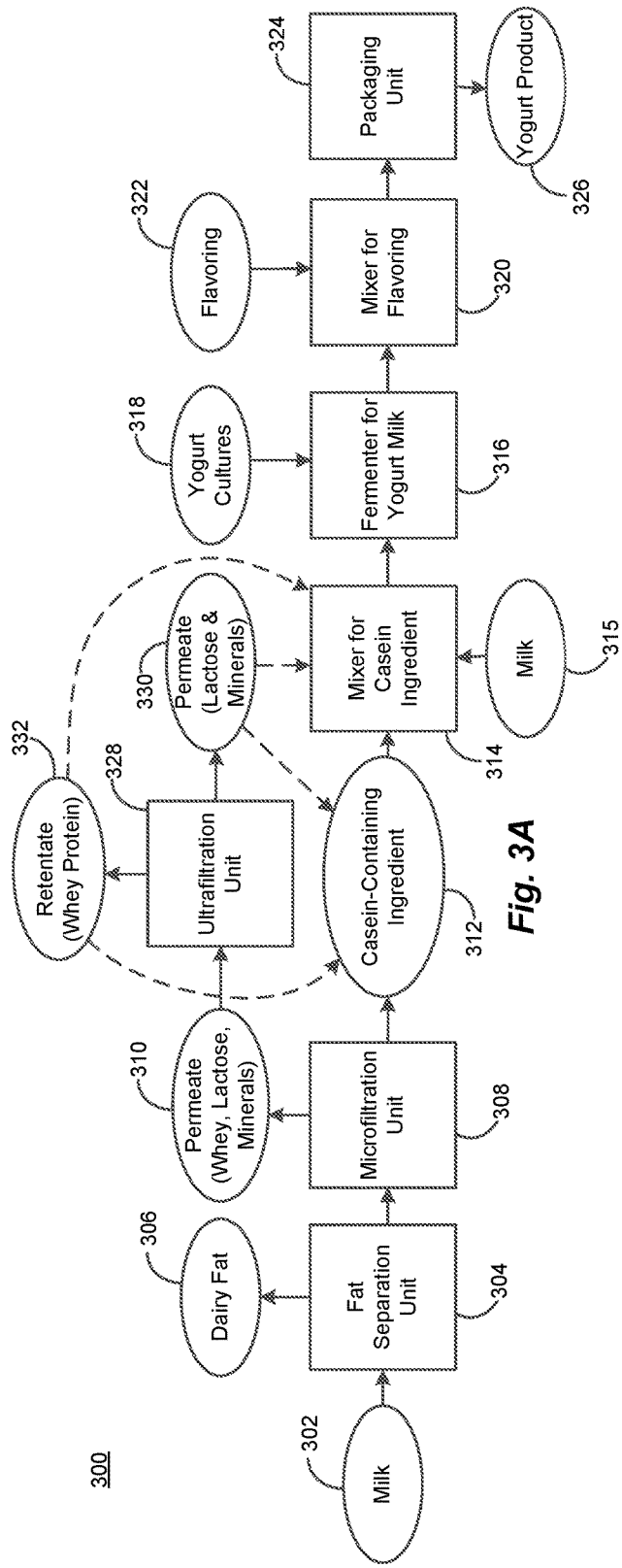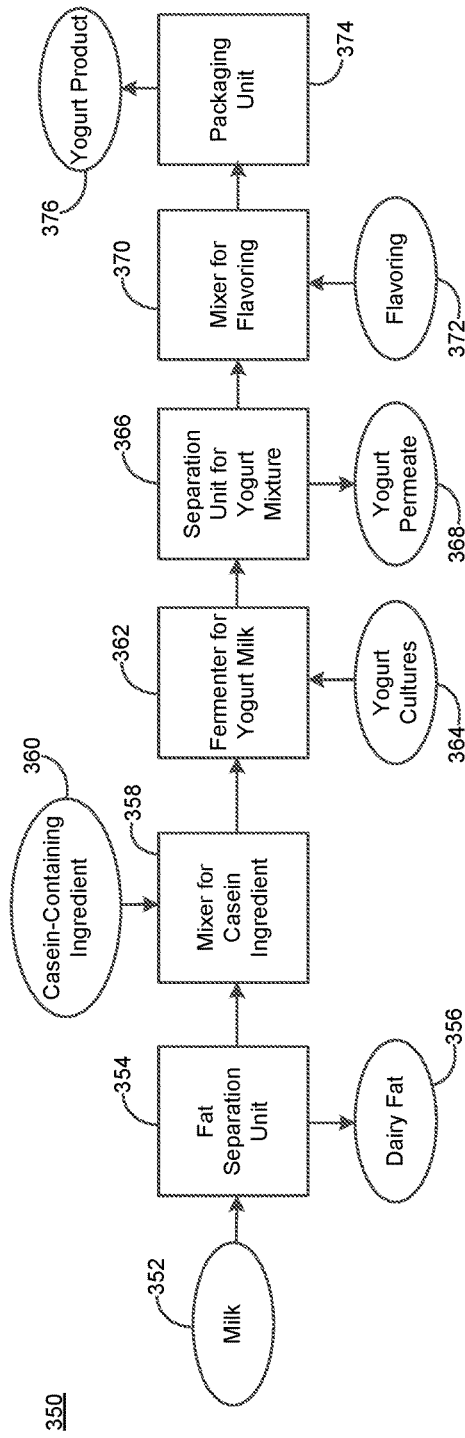
Fig. 3A
Fig. 3B

PROTEIN FORTIFIED YOGURTS AND METHODS OF MAKING

CROSS REFERENCES TO RELATED APPLICATIONS

This application is a continuation of U.S. Non-Provisional patent application Ser. No. 14/250,518, filed Apr. 11, 2014, which claims the benefit of priority to U.S. Provisional Patent Application No. 61/810,996 filed Apr. 11, 2013, the entire contents of which are incorporated herein by reference for all purposes.

BACKGROUND

Health-conscious consumers are increasingly recognizing the nutritional benefits of strained yogurt (sometimes referred to as "Greek yogurt"). Strained yogurt has higher amounts of protein than most conventional yogurts. The higher protein concentration gives strained yogurt a thick, creamy texture that many consumers prefer in addition to the potential nutritional benefits.

Techniques for making strained yogurt start by adding yogurt cultures to milk and fermenting the milk into conventional yogurt. Instead of stopping the process with conventional yogurt, strained yogurt processes further separate a liquid permeante and leave behind the strained yogurt product.

In a typical process for making strained yogurt, about three pounds of milk are used to make one pound of the strained yogurt. The other two pounds that are separated out of the yogurt consist mostly of the liquid permeate that is removed from the starting conventional yogurt. This liquid permeate contains water, proteins, lactic acid, dairy sugars (such as lactose), as well as minerals.

The large amounts of liquid permeante generated by conventional processes of making strained yogurt are creating a large disposal problem for the strained yogurt industry. Unlike cheesemaking, where the liquid whey protein separated from the cheese curd can be economically converted into whey protein ingredients for food, cosmetics and other uses, the permeate from strained yogurt processes is much more diluted and acidic. There are currently no economically viable uses for this liquid permeate, creating both an economic and environmental problem for strained yogurt makers.

Discharging the permeate into municipal waste streams has adverse environmental consequences because the sugars in the permeate are a food source to aerobic bacteria which could cause bacterial blooms that create oxygen-deprived dead zones in lakes and rivers. Thus in most regions, discharging of the permeate into rivers, lakes, and waste water treatment facilities is tightly regulated or forbidden.

Because they cannot cheaply dispose or sell the permeate, strained yogurt producers have been paying farmers and municipalities to take the permeate. Farmers will mix the permeate with animal waste and use it as fertilizer, or mix it with animal feed to increase its nutritional value. Municipalities will sometimes use the permeate in anaerobic digesters where bacteria convert sugars in the permeate to biofuels. Unfortunately the supply of the permeate is rapidly outstripping the demand for these uses, and permeate storage and disposal costs keep increasing as the popularity of strained yogurt continues to grow. Thus, there is a need for new techniques of making strained yogurt that reduce the amount of permeate. There is also a need to find new economical uses of the permeate so less of it has to be disposed of as waste. These and other problems are addressed.

BRIEF SUMMARY

Processes of making protein-fortified yogurt products, and the yogurt products made, are described. These processes may include adding a casein-containing ingredient, such as micellar casein, to the milk used to make the yogurt. The casein-containing ingredient, which may be 25% to 92% protein on a dry weight basis, increases the protein concentration in the yogurt mixture to that typical for strained yogurt (e.g., about 10 wt. % total protein) with less or no straining to remove a liquid permeate. The reduction or elimination of the liquid permeate reduces a significant expense in the production of strained yogurt from the disposal costs for the permeate. Elimination of the liquid permeate by keeping the permeante components in the final yogurt product has the added benefit of increasing the product yield of the strained yogurt, for example, from about 32% to over 100% based on the volume of starting milk.

It has also been discovered that increasing the protein concentration of the yogurt product beyond what is typical for strained yogurt can create a spreadable yogurt product with the consistency of butter or cream cheese. Unlike butter or cream cheese however, the present yogurt spreads are significantly lower in fat, calories, carbohydrates, saturated fat, and higher in protein. The spreadable yogurt products have a total protein concentration of about 11 wt. % or more (e.g., about 12 wt. % or more, about 13 wt. % or more, about 14 wt. % or more, etc.). Flavorings such as salt, herbs, spices, cheese flavoring, vegetables, meats, and fruits, may be added to produce a variety of yogurt spreads.

Embodiments of the invention include a method of making a protein fortified yogurt product. The method may include the step of mixing a casein-containing ingredient with starting milk to make a yogurt milk, where the casein-containing ingredient has a casein-to-whey protein ratio of 82:18 or greater. The yogurt milk may be fermented after adding yogurt culture to make a yogurt mixture. The yogurt mixture may be formed into the protein-fortified yogurt product, where a total protein concentration in the protein-fortified yogurt product is 10 wt. % or more.

Embodiments of the invention further include a method of making a protein fortified yogurt product that includes the step of microfiltering a first milk into whey-containing permeate and a casein-containing retentate. The casein containing retentate may be formed into a casein-containing ingredient that has a casein-to-whey protein ratio of 82:18 or greater. The casein-containing ingredient may be mixed with a starting milk to make a yogurt milk. The yogurt milk may be fermented after adding yogurt culture to make a yogurt mixture, and the yogurt mixture may be formed into the protein-fortified yogurt product. The total protein concentration in the protein-fortified yogurt product may be 10 wt. % or more.

Embodiments of the invention still further include a spreadable yogurt product comprising at least 11 wt. % total proteins. When a casein-containing ingredient is used to make the spreadable yogurt product, the casein-to-whey ratio in the yogurt product may be at least 82:18. The product may be flavored and packaged into a variety of shapes including a block, stick, cup, jar, or tub, among others.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 3A is a simplified schematic diagram of a system for making a protein-fortified yogurt product according to embodiments of the invention; and FIG. 3B is a simplified schematic diagram of a system for making a protein-fortified yogurt product according to additional embodiments of the invention.

DETAILED DESCRIPTION

Exemplary Processes of Making Protein-Fortified Yogurt Product

Figure 1:
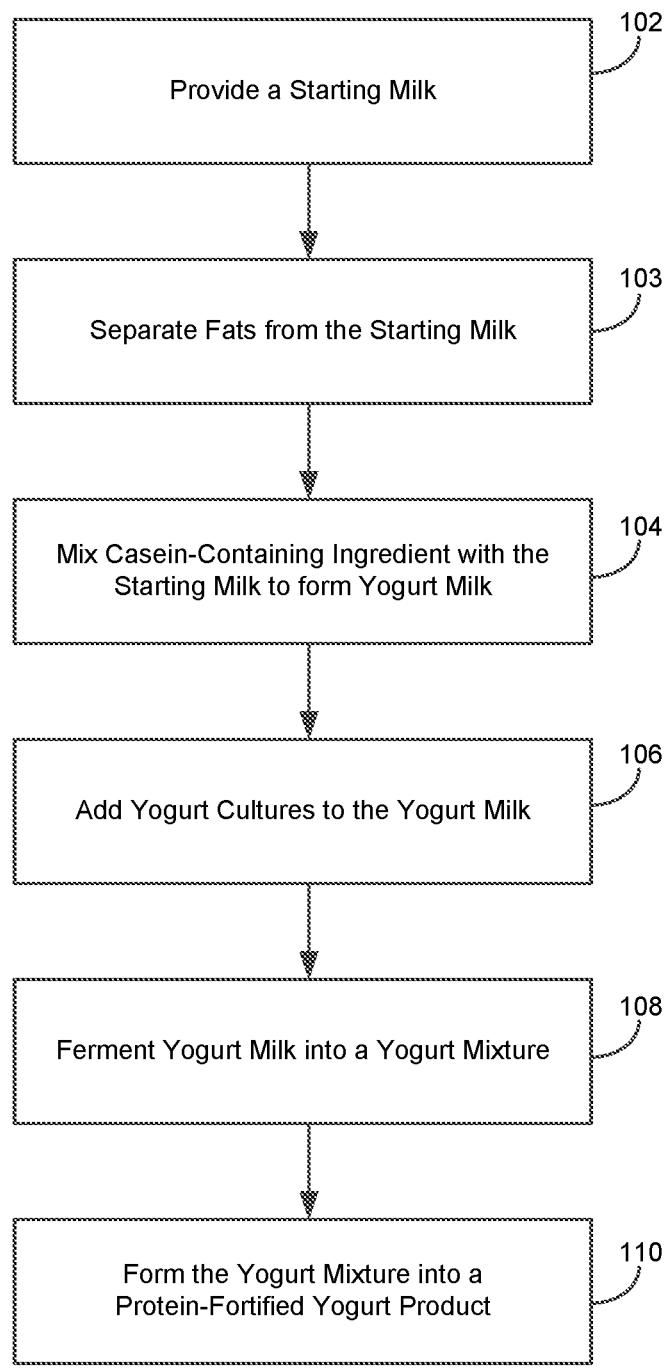
FIG. 1 is a flowchart showing selected steps in a method of making a protein-fortified yogurt product according to embodiments of the invention.

Specific processes for making protein-fortified yogurt products are now described. FIG. 1 shows a process 100 for making strained yogurt products that starts by providing a starting milk 102 that is used in forming a yogurt mixture. The starting milk may contain dairy fats that are optionally separated 103 and removed from the milk used in the yogurt mixture. The level of dairy fats desired in the final protein-fortified yogurt product controls the extent of fat removal in the starting milk. Alternately, the starting milk provided 102, may already have the dairy fats partially removed (e.g., low fat milk) or fully removed (e.g., skim or non-fat milk).

A casein-containing ingredient is mixed with the starting milk 104. The casein-containing ingredient may be added in an amount that raises the total protein level in the protein-fortified yogurt product to about 10 wt. % or more. In some instances, this will permit the protein concentration in the fortified-yogurt product to reach levels comparable to conventional strained yogurt (e.g., about 10 wt. %) without having to generate a liquid permeate. In other instances, the casein-containing ingredient can be added to an extent that it reduces the amount of permeate generated to a predefined target amount before the yogurt product has a protein level comparable to conventional strained yogurt or some other yogurt product.

The mixture of the casein-containing ingredients and starting milk may form a yogurt milk to which yogurt cultures may be added 106. The yogurt cultures may include *Streptococcus thermophilus*, *Lactobacillus bulgaricus* (among other lactobacilli), and bifidobacteria, among others. The culture-containing yogurt milk may then ferment for a period of time into a yogurt mixture 108. Depending on the amount of the casein-containing ingredient added to the starting milk, the yogurt mixture may have reached a total protein concentration for the final yogurt product without the need to remove a liquid permeate. In this case, the yogurt mixture may optionally be flavored and packaged as the yogurt product (e.g., yogurt, strained yogurt, spreadable yogurt, etc.).

Alternatively, if the yogurt mixture has not reached the desired total protein concentration, a liquid permeate may be separated from a retentate of the yogurt mixture that forms the final protein-fortified yogurt product 110. The liquid permeate may be separated from the final yogurt product with a variety of techniques, including straining, filtration, and centrifugation, among others. For example, the centrifugation technique may involve passing the yogurt mixture through a clarifier that rotates around an axis of rotation to separate the yogurt product from a liquid permeate which is decanted from the container.

The liquid permeate may include, water, proteins, lactic acid, dairy sugars (e.g., lactose), and dissolved minerals (e.g., calcium) from the starting milk. As noted below, the permeate may be treated to form an edible product, among other economically valuable products. Alternatively, the liquid permeate may be disposed of, used as a nutritional supplement for livestock feed, and/or converted into biogas or other biofuel in an anerobic digester.

A protein-fortified yogurt product (or products) is formed from the yogurt mix. The final yogurt product depends in part on the total protein concentration. For total protein concentrations less than 10 wt. %, the yogurt product may be a traditional unstrained yogurt such as a set-type yogurt and Swiss-style yogurt, among other products. If the total protein concentration ranges between 10-16 wt. %, the yogurt product may be a strained yogurt (e.g., Greek yogurt). When the total protein concentration is about 11 wt. % or above, the yogurt product may thicken to the consistency of cream cheese or butter, and become a spreadable yogurt product.

Exemplary Processes of Making Casein-Containing Ingredient

Figure 2A:
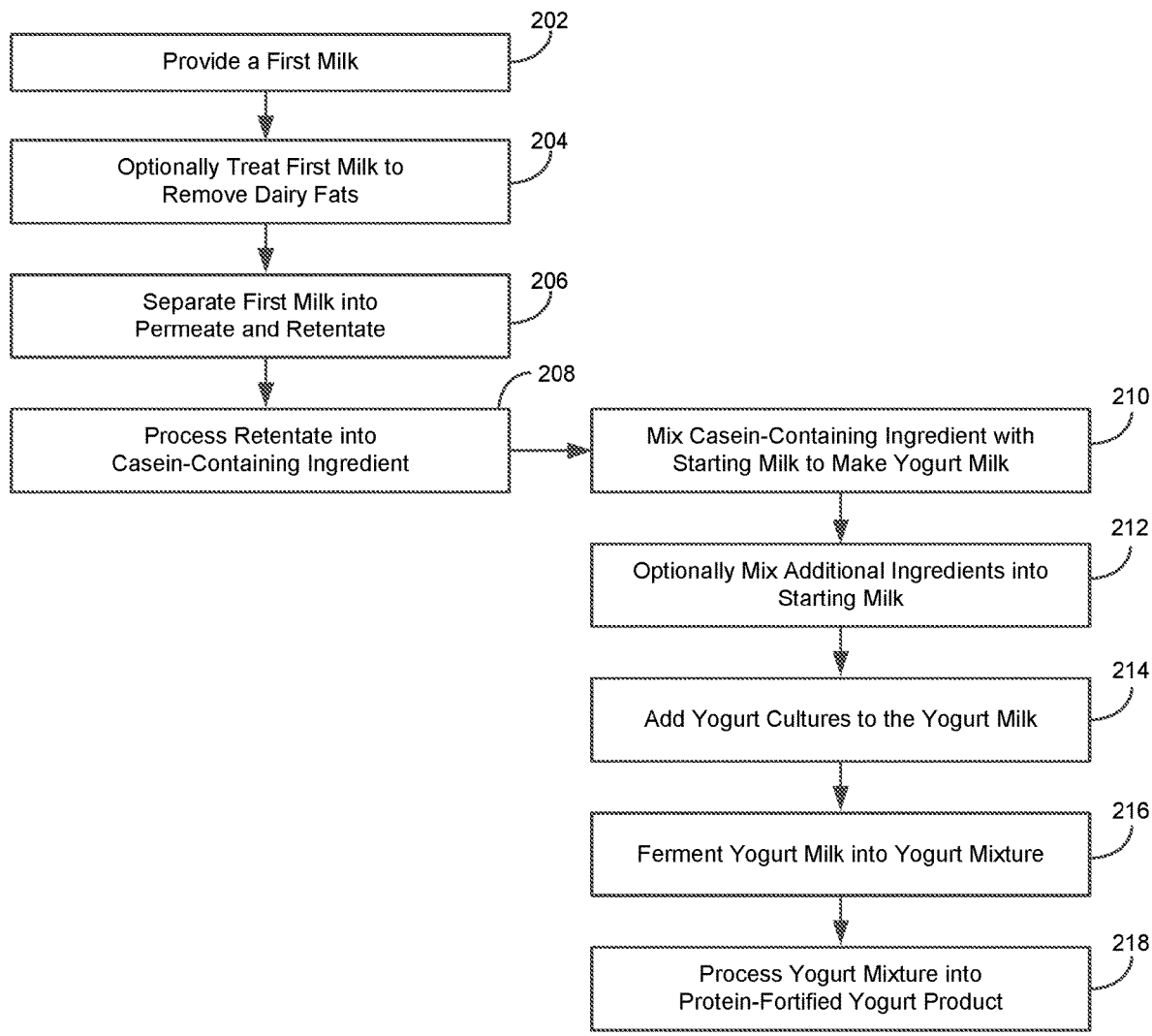
FIG. 2A is a flowchart showing selected steps in a method of making a casein-containing ingredient and protein-fortified yogurt according to additional embodiments of the invention.

The casein-containing ingredient may be derived from the separation of dairy milk into its casein and whey components. FIG. 2A illustrates selected steps in a process 200 of making a protein fortified yogurt product that starts by making the casein-containing ingredient used to fortify the starting milk of the yogurt. The process 200 starts with providing a first milk 202, which may be the same or different than the milk used as the starting milk of the yogurt. The first milk may optionally be treated to partially remove the dairy fats (e.g., low-fat milk) or completely remove them (skim or non-fat milk) 204, or alternatively the first milk may be provided with these fats partially or completely removed.

The optionally defatted first milk may then be microfiltered to separate the milk into a liquid permeate, and retentate 206. The liquid permeate includes whey protein, sugars, and minerals similar to liquid permeate generated from the strained yogurt. A significant difference between the permeates however is that the milk permeate does include high concentrations of byproducts from yogurt fermentation, such as the organic acids (e.g., lactic acid) and galactose produced from the fermentation of the dairy sugars (e.g., lactose). These by-products and the more dilute concentration of the whey protein in the yogurt permeate complicate efforts to convert it into commercially useful ingredients such as whey protein concentrate and lactose powder. In contrast the liquid whey permeate produced from the direct separation of the first milk can undergo additional treatment to make such ingredients. For example, the milk permeate may undergo a second filtration step (e.g., ultra-filtration) that catches the whey protein as the retentate while passing a liquid permeate that may include the dairy sugars and dissolved minerals. The whey protein retentate may be formed into whey protein concentrate ("WPC") or whey protein isolate ("WPI") depending on the purity level of the whey protein. The second, de-wheyed liquid permeate may be concentrated and/or the lactose crystallized and separated from the minerals and uncrystallized sugars to make lactose powder, among other treatments. The permeate may also optionally be added to the casein-containing ingredient added to the starting milk of the yogurt.

The casein-containing retentate may be processed into the casein-containg ingredient 208. Both the casein-containing retentate and ingredient have a higher casein-to-whey ratio higher than the unfiltered milk. Natural dairy milk has a casein-to-whey ratio of about 80:20. The present filtration processes increase that ratio to at least 82:18 and typically increase the ratio into a range from 85:15 to 99:1. Thus, the casein-to-whey ratio in the casein-containing retentate (and the ingredient formed from the retetnate) is higher than would be found in a conventional dairy powder such as non-fat dry milk powder or milk protein concentrate. The ratio is significantly higher than that found in a whey protein concentrate.

The removal of water, dairy sugars and dissolved minerals from the casein-containing retentate concentrates the total protein concentration in the casein-containing ingredient. Total protein levels in the casein-containing ingredient typically range from 25% to 92% by weight on a dry solids basis. An understanding of the total protein levels in the casein-containing ingredient and the starting milk can be used to determine a target protein level in the protein-fortified yogurt product.

The casein protein in the casein-containing ingredient may be micellar casein that forms a suspension in water. The casein-containing ingredient may be the liquid rentate separated from the microfiltration permeate. It may also be dried, shipped to the site of yogurt production, and added to the starting milk as a dry powder. Alternatively the casein-containing ingredient may be added as a paste or aqueous slurry to the starting milk.

The casein-containing ingredient may be added to a starting milk to make a yogurt milk 210. For some products, the lactose and minerals separated from the whey protein in a second filtration step may also optionally be incorporated into the casein-containing ingredient or added directly to the starting milk like the casein-containing ingredient. Similarly, some products may optionally incorporate the whey fraction of the second filtration step, and/or whey generated from some other source 212.

Yogurt cultures may be added to the yogurt milk made from the starting milk, casein-containing ingredient, and the optional additional ingredients (if present) 214. The culture-containing yogurt milk may then ferment for a period of time into a yogurt mixture 216 that is further processed into the final protein-fortified yogurt product 218.

In many instances, the final yogurt product will include additional ingredients that enhance the shelf-life, organoleptic qualities, and other properties of the product. These additional ingredients may include salt, fruit, herbs, flavorings such as cheese flavoring, vegetables, meats, and spices. They may also include ingredients such as a native or modified starch, a gum or cellulose, an acidity regulator, an acid, a coloring agent, a flavoring agent, a firming agent, a food protein, a gelling agent, a stabilizer, a thickener, an oil, a salt, a neutraceutical, a vitamin, and/or a mineral, among other ingredients. These ingredients may be added at one or more steps in the present methods, such as the formation of the yogurt milk, the yogurt mixture, and/or the final protein-fortified yogurt product.

Figure 2B:
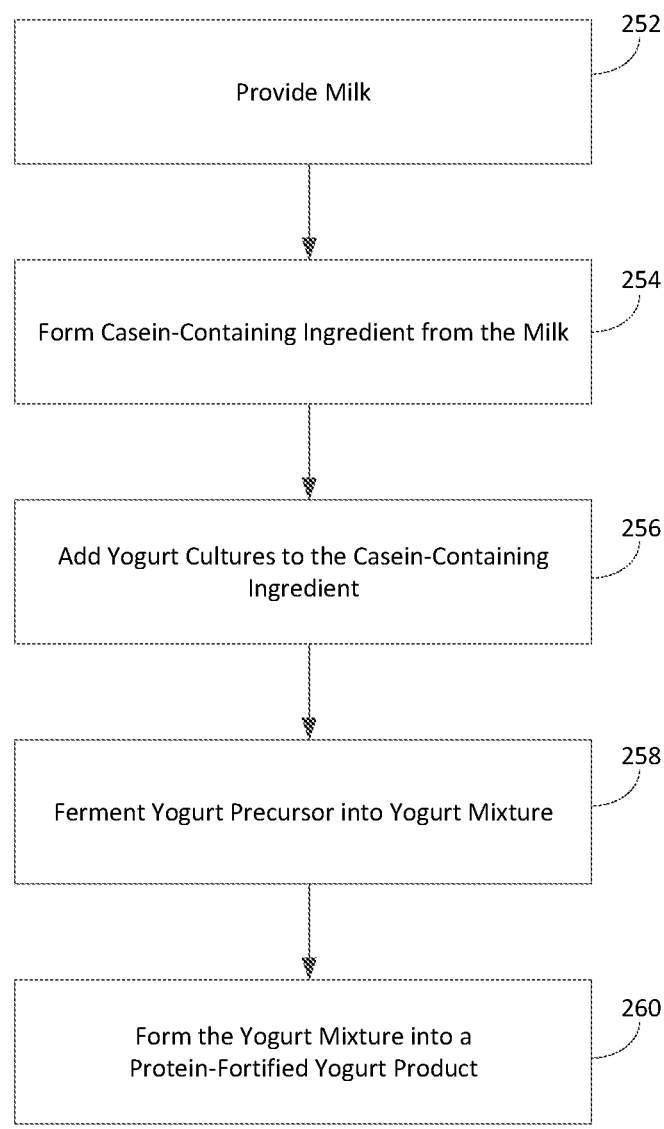
FIG. 2B is a flowchart showing selected steps in a method of making a protein-fortified yogurt from a casein-containing ingredient according to additional embodiments of the invention.

Referring now to FIG. 2B, selected steps in methods 250 of making protein-fortified yogurt products from a casein-containing ingredients are shown. The methods may include providing milk 252 and processing (e.g., filtering) it to produce a casein-containing ingredient 254. The casein-containing ingredient may be formed as a liquid (e.g., a liquid retentate) or may be converted into a liquid by the addition of liquid ingredients such a water.

Yogurt cultures may be added directly to the casein-containing ingredient 256 to form a yogurt precursor. The yogurt precursor may then be fermented into a yogurt mixture 258. The yogurt mixture may form into the protein-fortified yogurt product 260 with or without additional processing steps. The casein-containing ingredient may be formed (or filtered) to a yogurt protein concentration that will produce a final protein-fortified yogurt product having a total protein concentration of unstrained, strained or spreadable yogurt. Thus, depending on the protein concentration in the casein-containing ingredient and yogurt precursor, the method 250 may produce a yogurt product with the consistency of unstrained yogurt, strained yogurt, or spreadable yogurt. In method 250, the protein-fortified yogurt product may be produced without adding the casein-containing ingredient to a starting milk that forms a yogurt milk with the addition of yogurt cultures.

Systems of Making Protein-Fortified Yogurt Product

FIGS. 3A&B show selected components of systems for making protein-fortified yogurt products according to embodiments of the invention. FIG. 3A shows a system 300 that has milk 302 feeding a fat separation unit 304 to separate dairy fats 306 from the defatted first milk that is fed to a microfiltration unit 308. As noted in the discussion of the processes of making protein-fortified yogurt products, separating out dairy fats in the first milk is optional so the fat separation unit 304 is an optional component of system 300.

The microfiltration unit 308 separates the first milk into a liquid permeate 310 that contains whey protein as well as dissolved dairy sugars (e.g., lactose) and minerals, and a retentate 312 that is formed into the casein-containing ingredient. The retentate 312 may be added untreated to the mixer for the casein ingredient 314 with the starting milk 315. Alternatively, the retentate 312 may be treated by, for example drying into a powder before being added to the mixer 314. Additional ingredients such as the lactose and mineral permeate 330 and/or the whey protein retentate 332 may optionally be combined with the retentate 312 to create the casein-containing ingredient.

The mixer 314 creates a yogurt milk that is sent to the fermenter 316 where yogurt cultures 318 are added. The fermentation process converts the yogurt milk into a yogurt mix that may be sent to another mixer 320 to adding flavorings 322. The flavored yogurt mixture may then be packaged with the help of a packaging unit 324 into the final, protein-fortified yogurt product 326. Alternatively, flavorings (e.g., fruit flavorings) may be added to the bottom of the package before the unflavored yogurt mixture is added on top, or the yogurt mixture may be placed into the package first and the flavoring added on top. Alternating layers of yogurt mixture and flavoring, for example a flavoring layer positioned between two layers of yogurt mixture, are also contemplated.

It should be appreciated that some of the components shown in system 300 may be combined. For example the casin-containing ingredient mixer 314, fermenter 316, and flavoring mixer 320 may be combined into a single component where the casein-containing ingredient, yogurt cultures 318 and flavorings 322 are all combined (simultaneously or sequentially) to form the yogurt mixture that is packaged into yogurt product 326. Alternatively, the casein-containing ingredient, yogurt milk, and flavorings could be added directly to a package and ferment into the final yogurt product.

FIG. 3A also shows system components that further process the permeate 310 generated by the microfiltration unit 308. The permeate 310 may be filtered a second time by an ultrafiltration unit 328 capable of capturing the whey protein as a retentate 332 while passing dissolved lactose and minerals as another liquid permeate 330. Because the retentate 332 and permeate 330 are derived from milk that has not passed through a yogurt making process, they are both high quality and can be converted into commercial whey protein (e.g., WPC, WPI, native whey, serum proteins, etc.), and lactose, among other products. As noted above, these products may be added back to the casin-containing ingredient and/or the yogurt mixture.

Referring now to FIG. 3B, a system 350 is shown that adds a casein-containing ingredient 360 to yogurt precursors so a protein-fortified yogurt product 376 can be formed with less (or no) yogurt permeate 368. The system 350 starts with a starting milk 352 that may optionally go through a fat separation unit 354 to separate out a targeted portion of dairy fat 356. The starting milk may then be combined with the casein-containing ingredient 360 in the mixer 358. The casein-enhanced yogurt milk may then be sent to fermenter 362 where yogurt cultures 364 are added to form a yogurt mixture. If the yogurt mixture lacks the consistency of the final yogurt product 376, it may be processed in separation unit 366 which separates a liquid permeate 368 from the yogurt retentate. As noted above, the liquid permeate 368 may include water, whey protein, dairy sugars and minerals, among other compositions. By adding the casein-containing ingredient 360 upstream, less permeate needs to be extracted from the yogurt mixture to reach the target protein level in the final yogurt product 376.

The final steps of making the yogurt product 376 in system 350 may include adding flavoring 372 to the yogurt mixture at the mixer 370, and packaging the flavored mixture at packaging unit 374. It should be appreciated that an unflavored yogurt product 376 would bypass mixer 370. It should also be appreciated that, like system 300, some of the components can be combined into a single component, for example the fermenter 362, separation unit 366, and mixer 370.

It should further be appreciated that the present systems may provide additional ingredients to the yogurt product 376. As noted above, the yogurt product may include additional ingredients that enhance the shelf-life, organoleptic qualities, and other properties of the product. The present systems may add these ingredients to one or more of components, such as the mixer 314 or 358, fermenter 316 or 362, and/or flavor mixer 320 or 370, among other system components.

Whey Retention

In some embodiments, whey retention techniques may be used to raise the total protein concentration in the protein-fortified yogurt product. As noted above, some amount of protein is lost in the liquid permeate during in conventional methods of making strained yogurt. Some of this protein may be retained in the yogurt retentate by processing the starting milk to increase the amount of whey protein that binds to the casein protein.

For example, exposing natural dairy milk to high shear homogenization and heat treatments can increase the amount of whey protein bound to the casein in the yogurt retentate. The high shear homogenization may include homogenizing the starting milk at a pressure of about 1500 to 4000 psi, and then heating the milk a temperature of 170° F. to 220° F. for a period of 1 to 10 minutes.

In some instances, whey protein may be added to the starting milk prior to performing the whey retention techniques to further increase the amount of retained whey in the protein-fortified yogurt product. For example, a whey protein concentrate that may or may not be derived from the liquid permeate of the yogurt mixture may be added to the starting milk that is subsequently treated to retain more of the whey. This may reduce the amount of casein-containing ingredient needed to raise the total protein concentration in the yogurt milk to a target level. Retaining additional whey from the starting milk can also reduce the amount of yogurt liquid permeate generated as well as finding a use for the whey protein in the permeate that is generated.

Protein-Fortified Yogurt Products

The protein-fortified yogurt products may include spreadable yogurt products having a total protein content of about 11 wt. % or more. As noted above, the spreadable product achieves its spreadable consistency through the high protein concentration rather than the use of non-protein thickening agents (e.g., gums, celluloses, starches, etc.) or a high fat content. In some embodiments, the spreadable yogurt product may exclude ingredients high in dairy fats, such as cheeses (e.g., cream cheese), cream, butter, and sour cream, among others, that are sometimes added to yogurts to make them thicker and give them a spreadable consistency.

The ratio of casein-to-whey protein in this spreadable product may be about 82:18 or more, for example the ratio may range from 85:15 to 99:1. As noted above, this ratio is higher than the 80:20 ratio in native dairy milk due to the addition of the casein-containing ingredient. Because of the addition of the casein-containing ingredient, the higher casein-to-whey ratio can be achieved even when little or no whey is removed from the product in a liquid whey permeate.

The high protein levels in the spreadable yogurt product may be complemented with reduced levels of total fats and sugars. For example the yogurt product may have a total fat concentration of about 10 wt. % or less (e.g., about 1 wt. % or less), and a total sugars concentration of about 6 wt. % or less (e.g., about 1 wt. % or less). The increase in total protein concentration coupled with a reduction in total fat and sugar concentration can provide nutritional benefits over spreads with higher amounts of fats and sugars.

The spreadable yogurt product may be unflavored, or may include flavorings to increase the variety and improve the taste of the products. Exemplary flavorings may include salt, fruit, herbs, cheese flavoring, and spices, among other flavorings. The spreadable yogurt product may include additional ingredients such as a native or modified starch, a gum or cellulose, an acidity regulator, an acid, a coloring agent, a flavoring agent, a firming agent, a food protein, a gelling agent, a stabilizer, a thickener, an oil, a salt, a neutraceutical, a vitamin, and/or a mineral, among other ingredients.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the protein" includes reference to one or more proteins and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a protein-fortified yogurt product, the method comprising:
    mixing a casein-containing ingredient with starting milk to make a yogurt milk, wherein the casein-containing ingredient has a casein-to-whey protein ratio of 82:18 or greater, and wherein the yogurt milk does not contain yogurt before the addition of a yogurt culture;
    adding the yogurt culture directly to the yogurt milk to make a yogurt mixture, wherein the yogurt mixture contains yogurt; and
    forming the yogurt mixture into the protein-fortified yogurt product, wherein a total protein concentration in the protein-fortified yogurt product is 10 wt. % or more, and wherein the protein-fortified yogurt product has a weight ratio of total sugars to total proteins of less than or about 1:10.

2. The method of claim 1, wherein the casein-to-whey protein ratio in the casein-containing ingredient has a range of 85:15 to 99:1.

3. The method of claim 1, wherein the casein-containing ingredient has a total protein concentration on a dry basis of 25 wt. % to 92 wt. %.

4. The method of claim 1, wherein the casein-containing ingredient comprises a micellar casein.

5. The method of claim 1, wherein the casein-containing ingredient is a powder.

6. The method of claim 1, wherein the total protein concentration in the protein-fortified yogurt product is 11 wt. % or more.

7. The method of claim 1, wherein the step of forming the yogurt mixture into the protein-fortified yogurt product comprises centrifuging the yogurt mixture into a liquid permeate and yogurt retentate, wherein the yogurt retentate is formed into the protein-fortified yogurt product.

8. The method of claim 7, wherein the method further comprises adding a flavoring to the yogurt retentate to form the protein-fortified yogurt product.

9. The method of claim 7, wherein the method further comprises adding a flavoring to the yogurt mixture.

10. The method of claim 7, wherein the liquid permeate comprises whey protein, wherein the whey protein in the liquid permeate is treated to form an edible whey protein.

11. The method of claim 10, wherein the edible whey protein comprises a whey protein concentrate or whey protein isolate.

12. The method of claim 10, wherein the method further comprises processing the starting milk to increase whey protein binding to casein protein in the starting milk.

13. The method of claim 12, wherein the processing of the starting milk comprises:
    exposing the starting milk to high-shear conditions; and
    heating the starting milk.

14. The method of claim 12, wherein the processing of the starting milk reduces the whey protein in the liquid permeate.

15. The method of claim 1, wherein the method comprises adding an additional ingredient to the yogurt milk, the yogurt mixture, or the protein-fortified yogurt product, wherein the additional ingredient is chosen from a native or modified starch, a gum or cellulose, an acidity regulator, an acid, a coloring agent, a flavoring agent, a firming agent, a food protein, a gelling agent, a stabilizer, a thickener, an oil, a salt, a neutraceutical, a vitamin, and a mineral.

16. A method of making a protein-fortified yogurt product, the method comprising:
    microfiltering a first milk into whey-containing permeate and a casein-containing retentate, wherein the casein containing retentate is formed into a casein-containing ingredient;
    mixing the casein-containing ingredient with a starting milk to make a yogurt milk, wherein the casein-containing ingredient has a casein-to-whey protein ratio of 82:18 or greater, and wherein the yogurt milk does not contain yogurt before the addition of a yogurt culture;
    adding the yogurt culture directly to the yogurt milk to make a yogurt mixture, wherein the yogurt mixture contains yogurt; and
    forming the yogurt mixture into the protein-fortified yogurt product, wherein a total protein concentration in the protein-fortified yogurt product is 10 wt. % or more, and wherein the protein-fortified yogurt product has a weight ratio of total sugars to total proteins of less than or about 1:10.

17. The method of claim 16, wherein the whey-containing permeate is ultrafiltered into a whey-containing retentate and a lactose-containing permeate.

18. The method of claim 17, wherein the whey-containing permeate is formed into an edible whey protein, and wherein a portion of the edible whey protein is added to the starting milk.

19. The method of claim 18, further comprising processing the starting milk to increase whey protein binding to casein protein in the starting milk.

20. The method of claim 19, wherein the processing of the starting milk reduces the whey protein in a liquid permeate generated by the yogurt mixture when forming the protein-fortified yogurt product.

21. The method of claim 17, wherein a portion of the lactose-containing permeate is added to the casein-containing ingredient.

22. A yogurt product comprising:
at least 11 wt. % total proteins;
a total fat concentration of about 1 wt. % or less;
wherein a casein-to-whey ratio in the yogurt product is at least 82:18, and
wherein a weight ratio of total sugars to total proteins in the yogurt product is less than or about 1:10.

23. The yogurt product of claim 22, wherein the yogurt product comprises at least 12 wt. % total proteins.

24. The yogurt product of claim 22, wherein the casein-to-whey ratio in the yogurt product ranges from 85:15 to 99:1.

25. The yogurt product of claim 22, wherein the product comprises a flavoring.

26. The yogurt product of claim 25, wherein the flavoring includes one or more ingredients chosen from salt, fruit, herbs, cheese flavoring, vegetables, meats, and spices.

27. The yogurt product of claim 22, wherein the product comprises an additional ingredient chosen from a native or modified starch, a gum or cellulose, an acidity regulator, an acid, a coloring agent, a flavoring agent, a firming agent, a food protein, a gelling agent, a stabilizer, a thickener, an oil, a salt, a neutraceutical, a vitamin, and a mineral.

28. The yogurt product of claim 22, wherein the product is packaged into a block, stick, cup, jar, or tub.

29. The yogurt product of claim 22, wherein the product has a total sugars concentration of 1 wt. % or less.

30. The yogurt product of claim 22, wherein the product does not contain cheese, and/or wherein the product is not made with cream, butter, or sour cream.

31. A method of making a protein-fortified yogurt product, the method comprising:
providing a casein-containing ingredient, wherein the casein-containing ingredient has a casein-to-whey protein ratio of 82:18 or greater;
adding yogurt culture to the casein-containing ingredient to make a yogurt precursor; and
forming the yogurt precursor into the protein-fortified yogurt product, wherein a total protein concentration in the protein-fortified yogurt product is 10 wt. % or more, and wherein the protein-fortified yogurt product has a weight ratio of total sugars to total proteins of less then or about 1:10.

32. The method of claim 31, wherein the yogurt precursor does not include a starting milk.

33. The yogurt product of claim 22, wherein the total proteins include micellar casein.

34. The method of claim 1, wherein forming the yogurt mixture comprises reduced or eliminated separation of a liquid permeate from the yogurt mixture.

35. The method of claim 1, wherein a product yield of the protein fortified yogurt product is greater than 32%, based on a volume of the starting milk.

* * * * *